(12) United States Patent
Lee

(10) Patent No.: US 9,933,860 B2
(45) Date of Patent: Apr. 3, 2018

(54) ALPHABET INPUT SYSTEM

(71) Applicant: Sun-Gyu Lee, Chungcheongnam-do (KR)

(72) Inventor: Sun-Gyu Lee, Chungcheongnam-do (KR)

( * ) Notice: Subject to any disclaimer, the term of this patent is extended or adjusted under 35 U.S.C. 154(b) by 0 days.

(21) Appl. No.: 15/113,320

(22) PCT Filed: Mar. 13, 2015

(86) PCT No.: PCT/KR2015/002439
§ 371 (c)(1),
(2) Date: Jul. 21, 2016

(87) PCT Pub. No.: WO2015/141987
PCT Pub. Date: Sep. 24, 2015

(65) Prior Publication Data
US 2017/0010684 A1    Jan. 12, 2017

(30) Foreign Application Priority Data
Mar. 17, 2014    (KR) .................. 10-2014-0030915

(51) Int. Cl.
  *G06F 3/02*    (2006.01)
  *G06F 3/023*   (2006.01)
  *G06F 1/16*    (2006.01)

(52) U.S. Cl.
  CPC .......... *G06F 3/0235* (2013.01); *G06F 1/1666* (2013.01); *G06F 3/023* (2013.01); *G06F 3/0233* (2013.01)

(58) Field of Classification Search
  CPC ...... G06F 3/023; G06F 3/0233; G06F 3/0235; G06F 1/1666
  See application file for complete search history.

(56) References Cited

U.S. PATENT DOCUMENTS 5,307,267 A * 4/1994 Yang ................. G06F 3/018
                                               715/210
7,626,574 B2    1/2009 Kim
(Continued)

FOREIGN PATENT DOCUMENTS

KR    20-0419301 Y1    6/2006
KR    10-2012-0067263 A    6/2012

OTHER PUBLICATIONS

International Search Report issued in a corresponding application PCT/KR2015/002439 dated Jun. 26, 2015.

*Primary Examiner* — Kent Chang
*Assistant Examiner* — Mark Edwards
(74) *Attorney, Agent, or Firm* — Maschoff Brennan

(57) ABSTRACT

The present invention relates to an alphabet input system comprising: a plurality of representative keys for inputting matched first letters of the alphabet; and a combination key for generating combination letters of the alphabet that are excluded from the first letters and that are input by a combination with one of the plurality of representative keys, wherein each combination letter is pictographically derived from the shape of the first letter matched respectively to the plurality of representative keys and from a combination symbol of the combination key having a "reverse J" shape. Accordingly, the alphabet can be input more quickly and accurately by combining intuitive and consistent pictographic symbols in a miniaturised input device.

4 Claims, 3 Drawing Sheets

(56) References Cited

U.S. PATENT DOCUMENTS

| | | | |
|---|---|---|---|
| 7,570,251 B2* | 8/2009 | Ji | G06F 3/018 341/22 |
| 8,339,291 B2 | 12/2012 | Nyang et al. | |
| 2010/0201628 A1* | 8/2010 | Lee | G06F 3/0233 345/169 |
| 2011/0080346 A1 | 4/2011 | Cha | |

* cited by examiner

Fig. 4

| 1 ㄱ<br>ΛEΛ | 2 ㄴ<br>-G' | 3 ㅐㅓ<br>PJ₄ |
|---|---|---|
| 4 ㄹ<br>CK▾ | 5 ㅁ<br>IM_ | 6 ㅗㅜ<br>ƆNβ |
| 7 ㅅ<br>OU? | 8 ㅇ<br>ㅏW; | 9 ㅣ<br>\X~ |
| * MANNER<br>STROKE ADDITION<br>SYMBOL | 0 GO<br>VZ@ | # LOCK<br>SSANGJAEUM |

Fig. 5

| C G | E B | N m |
|---|---|---|
| O Q | ㄱ | F R |
| P R | U W | T J |
| I H | Y K | L D |

Fig. 6

| CHARACTER | COMBINATION METHOD | CHARACTER | COMBINATION METHOD |
|---|---|---|---|
| A | F + ㄱ | N | N |
| B | E + ㄱ | O | O |
| C | C | P | P |
| D | L + ㄱ | Q | O + ㄱ |
| E | E | R | P + ㄱ |
| F | F | S | T + ㄱ |
| G | C + ㄱ | T | T |
| H | I + ㄱ | U | U |
| I | I | V | ㄱ + Y |
| J | ㄱ + U | W | U + ㄱ |
| K | Y + ㄱ | X | ㄱ + I |
| L | L | Y | Y |
| M | N + ㄱ | Z | ㄱ + L |

ALPHABET INPUT SYSTEM

CROSS-REFERENCE TO RELATED APPLICATIONS

The present application is a U.S. National Phase of PCT/KR2015/002439 filed on Mar. 13, 2015 claiming priority to Korean Patent application No. 10-2014-0030915 filed on Mar. 17, 2014. The disclosure of the PCT Application is hereby incorporated by reference into the present Application.

TECHNICAL FIELD

The present invention relates to an alphabet input system, and more particularly, to an alphabet input system capable of more quickly inputting alphabets in a compact input system with accuracy by combining an intuitive and consistent pictographic symbol with the alphabets.

BACKGROUND ART

The suggestion and realization for reducing the size of an alphabet keyboard have been continuously performed. Korean Patent Publication No. 10-2001-0025429 (published on Apr. 6, 2001; METHOD FOR INPUTTING ENGLISH USING THE COMPACT KEY-PAD) suggests a compact key-pad that inputs a character key and a function key by simultaneously pressing these keys.

The type of a representative compact alphabet character input device similar to the related art and the problems thereof are described as follows.

FIG. 1 is a diagram showing an arrangement structure of an existing alphabet input device that uses a toggle type. Referring to FIG. 1, in a general input system having a 4×3 key structure, since the characters are dependently arranged irrespective of the frequency in use of the alphabets, there is an inconvenience that the input is performed up to 4 times in order to input one character dependent on each representative character.

When two characters included in the same character or the same key are successively input, since a delimiter is separately input, the typing count is up to 6 times, and thus, the typing count is wasted. Accordingly, there is a limitation in performing high-speed input in the compact device.

FIG. 2 is a diagram showing an arrangement structure of a one-to-one input type QWERTY technology. In such an input type, a compact mechanical input device having a structure in which independent keys are respectively input and physical touch is used. However, since the weight and size of a handheld device are remarkably affected by the arrangement of the input system, the portability of the handheld device is deteriorated.

A touch-type QWERTY input device in which independent keys are input on a screen display device (LCD display etc.) is used as another method. However, since the size of an input unit is reduced, there is a problem that a typographical error rate is increased, and since there is a limitation of the size capable of being minimized, such a input device is unsuitable for universally being used in all compact devices.

FIGS. 3 and 4 are diagrams showing character input arrangement structures using the combination method of the related art. In the method shown in FIGS. 3 and 4, in order to achieve the minimum typing count and the combination principle, the representative keys are arranged in consideration of the frequency of use, and thus, an input speed is partially enhanced. However, there may be a discrepancy in interpretation of a combination form between individuals.

Since there is little correlation between combinations in many cases, a user is difficult to learn the usage, and since it takes a long time to learn the usage, there is a limitation of practical values.

Even though there are various alphabet input methods, a general and ultimate compact alternative input system does not come into wide use.

DISCLOSURE

Technical Problem

The invention has been made in order to solve such problems in the related art, and it is an object of the invention to provide an alphabet input system which uses an intuitive and consistent character combination method.

It is another object of the invention to provide an alphabet input system which is easily applicable to a compact device and is capable of inputting a character desired to be input the minimized input number of times.

It is still another object of the invention to provide an alphabet input system which is capable of consistently the repeated input of an input character.

It is still another object of the invention to provide a compact alphabet input system having high portability and compatibility by sharing the form of a typical character input system having 4×3 key arrangement.

Technical Solution

In order to achieve the above object, the present invention can be accomplished by an alphabet input system including: a plurality of representative keys that is used to input first matched characters among alphabets; and a combination key that is input in combination with any one of the plurality of representative keys and is used to generate combination characters which are alphabets except for the first characters. The combination characters are pictographically derived from combinations of a combination symbol having a 'reversed J' shape as the combination key with a shape of the first character matching to each of the plurality of representative keys.

Here, the combination character may include a second character which is a character generated by sequentially inputting the representative key and the combination key, and a third character which is a character generated by sequentially inputting the combination key and the representative key.

Meanwhile, the combination character may include a second character which is a character generated by inputting the representative key while the combination key is input, and a third character which is a character generated by inputting the representative key and then inputting the combination key multiple times.

Here, the first character may include 'C', 'E', 'N', 'O', 'F', 'T', 'I', 'Y', and among the alphabets, the second character may include 'G', 'B', 'M', 'Q', 'A', 'R', 'W', 'S', 'H', 'K', and 'D' among the alphabets, and the third character may include 'J', 'X', 'V', and 'Z' among the alphabets.

The plurality of representative keys may be 11 keys, the combination key may be one key, and the keys may be used to input the alphabets.

Here, positions in which the plurality of representative keys and the combination key are arranged may be changed, and the first characters which respectively match to the plurality of representative keys may be set.

A designation character input by an input form of the third characters may be additionally set to the plurality of representative keys to which the third characters of 'J', 'X', 'V' and 'Z' are not set.

Effect of the Invention

According to the present invention, since combination keys are input by a pictographic principle by using representative keys and only one combination key in a compact alphabet input system, it is possible to easily predict a character to be derived through this combination, and since the alphabet input system has generally a consistent input structure, it is possible to greatly reduce a usage understanding and leaning procedure.

Since the input of one character is completed by simply combining two keys, the typing count is not wasted, and since characters having high frequency of use are arranged as the first characters and characters having relatively higher frequency of use are arranged in a space adjacent to the 'reversed J' key, it is possible to remarkably improve input efficiency.

It is possible to realize a successive input function of the same character which is hardly realized in a compact toggle-type input system of the related art without adding a separate function key except for the combination key.

It is possible to provide the alphabet input system having high portability to which the present invention is applicable by sharing the same number of keys as that of the typical character input system having 4×3 key arrangement and allowing a position of a 'reversed J' key to have the same arrangement as that of reference keys in the typical character input system without separately modifying the structure thereof.

DESCRIPTION OF DRAWINGS

FIG. 1 is a diagram showing an arrangement structure of an existing alphabet input device that uses a toggle method of the related art.

FIG. 2 is a diagram showing an arrangement structure of a one-to-one input type QWERTY technology of the related art.

FIGS. 3 and 4 are diagrams showing arrangement structures of technologies that use the combination method of the related art.

FIG. 5 is a diagram showing an input key arrangement structure of an alphabet input system according to an embodiment of the present invention.

FIG. 6 is a diagram for describing a derivation principle and an input order of combination characters according to the embodiment of the present invention.

BEST MODE

Figures 1, 2, 3:

Combination characters may be input through the generating of second and third characters by sequentially inputting a representative key and a combination key.

If the representative key (first character) is input and then a 'reversed J' key is sequentially input, a second desired character is input by retroactively applying the 'reversed J' key to the previously input first character.

The second characters of 'G', 'B', 'M', 'Q', 'A', 'R', 'W', 'S', 'H', 'K', and 'D' are input by combining the 'reversed J' as the combination key with the first characters of 'C', 'E', 'N', 'O', 'F', 'P', 'U', 'T', 'I', 'Y', and 'L'. The combinations thereof are as follows.

'G' is 'C'+'reversed J', 'B' is 'E'+'reversed J', and 'M' is 'N'+'reversed J'.

'Q' is 'O'+'reversed J', 'A' is 'F'+'reversed J', and 'R' is 'P'+'reversed J'.

'W' is 'U'+'reversed J', 'S' is 'T'+'reversed J', and 'H' is 'I'+'reversed J'.

'K' is 'Y'+'reversed J', and 'D' is 'L'+'reversed J'.

The third characters may be input by pressing and releasing the representative characters ('U', 'I', 'Y', and 'L') and then successively inputting the 'reversed J' key (may be retroactively applied to the second character). The combinations thereof are as follows.

'J' is 'U'+'reversed J'+'reversed J', and 'X' is 'I'+'reversed J'+'reversed J'.

'V' is 'Y'+'reversed J'+'reversed J', and 'Z' is 'L'+'reversed J'+'reversed J'.

The third characters of 'J', 'X', 'V', and 'Z' may be generated by sequentially inputting the combination key and the representative key in a reversed order of the sequential input order of the second character of the representative key and the combination key.

For example, in FIG. 6, the second character of 'W' is generated if the representative key matching to 'U' and the combination key are sequentially input, but 'J' is input if the combination key and the representative key matching to 'U' are sequentially input.

Here, the sequential input is the meaning including the additional input for generating the combination character while a pressing state of any one of the representative key and the combination key is maintained.

For example, if the representative key ('U', 'I', 'Y', or 'L') is pressed in the pressing state (+) of the 'reversed J' key, a method in which the third character of 'J' or 'X' or 'V' or 'Z' is preferentially input over the second character is used, and the combinations thereof are as follows.

'J' is 'revered J'+'U', and 'X' is 'reversed J'+'I'.

'V' is 'reversed J'+'Y', and 'Z' is 'reversed J'+'L'.

MODE FOR CARRYING OUT THE INVENTION

Hereinafter, embodiments according to the present invention will be described in detail with reference to the accompanying drawings.

FIG. 5 is a diagram showing an input key arrangement of an alphabet input system according to an embodiment of the present invention, and FIG. 6 is a diagram for describing a derivation principle and an input order of combination characters according to the embodiment of the present invention. Referring to FIGS. 5 and 6, an alphabet input system according to the embodiment of the present invention includes a plurality of representative keys and a combination key.

The plurality of representative keys is provided to input first matched characters among alphabets. In the embodiment of the present invention, the first matched characters are, for example, characters input so as to match to the independent inputs of the representative keys and include 11 keys.

In the embodiment of the present invention, the first matched characters include 'C', 'E', 'N', 'O', 'F', 'P', 'U', 'T', 'I', 'Y' and 'L'.

The combination key is input in combination with any one of the plurality of representative keys, and thus, the combination characters which are alphabets except for the first characters are generated.

In the embodiment of the present invention, the combination characters include second characters and third characters.

For example, the second characters include 'G', 'B', 'M', 'Q', 'A', 'R', 'W', 'S', 'H', 'K', and 'D' among the alphabets, and the third characters include 'J', 'X', 'V', and 'Z'.

As shown in FIG. 5, a character to be derived by combining a shape of 'reversed J' with the first character may be assumed, and a combined character is pictographically derived from a combination symbol having a 'reversed J' shape as the combination key with a shape of each of the first characters which respectively match to the plurality of representative keys.

Accordingly, a user can intuitively ascertain the derivation principle of the combination character, and thus, the user can be easily skilled at generating the combination characters.

In the present invention, a total of 11 characters of 'C', 'E', 'N', 'O', 'F', 'P', 'U', 'T', 'I', 'Y' and 'L' as the first characters corresponding to the representative keys are completely input by independently inputting the representative keys once.

As the input methods of the second characters and the third characters, there may be respectively two examples.

First Example

The second and third characters are generated by sequentially inputting the representative keys and the combination key, and thus, the combination characters may be input.

If the representative key (first character) is input and then the 'reversed J' key is sequentially input, the 'reversed J' key is retroactively applied to the previously input first character, and thus, the second character is input.

The 'reversed J' key as the combination key is combined with the first characters of 'C', 'E', 'N', 'O', 'F', 'P', 'U', 'T', 'I', 'Y' and 'L' and the second characters of 'G', 'B', 'M', 'Q', 'A', 'R', 'W', 'S', 'H', 'K' and 'D' are input. The combinations thereof are as follows.

'G' is 'C'+'reversed J', 'B' is 'E'+'reversed J', and 'M' is 'N'+'reversed J'.

'Q' is 'O'+'reversed J', 'A' is 'F'+'reversed J', and 'R' is 'P'+'reversed J'.

'W' is 'U'+'reversed J', 'S' is 'T'+'reversed J', and "H" is T+'reversed J'.

'K' is 'Y'+'reversed J', and 'D' is 'L'+'reversed J'.

The representative key ('U', 'I', 'Y' or 'L') is pressed and released and then the 'reversed J' key is successively input, and thus the third character may be input (may be retroactively applied to the second character). The combinations thereof are as follows.

'J' is 'U'+'reversed J'+'reversed J', and "X" is 'I'+'reversed J'+'reversed J'.

'V' is 'Y'+'reversed J'+'reversed J', and 'Z" is 'L'+'reversed J'+'reversed J'.

The third characters of 'J', 'X', 'V' and 'Z' may be generated by sequentially inputting the combination key and the representative key in a reverse order of the sequential input order of the representative key and the combination key for the second character.

For example, FIG. 6 shows a method in which if the representative key matching to 'U' and the combination key are sequentially input, the second character 'W' is generated and if the combination key and the representative key matching to 'U' are sequentially input, 'J' is input.

Here, the sequential input is the meaning including the additional input for generating the combination character while a pressing state of any one of the representative key and the combination key is maintained.

For example, a method in which if each representative key ('U', 'I', 'Y' or 'L') is pressed in a pressing state (+) of the 'reversed J' key, the third character 'J' or 'X' or 'V' or 'Z' is preferentially input over the second character is used, the combinations thereof are as follows.

'J' is 'reversed J'+'U', and 'X' is 'reversed J'+'I'.

'V' is 'reversed J'+'Y', and 'Z' is 'reversed J'+'L'.

Second Example

The second character as the combination character may be generated by inputting the representative key in the input state of the combination key, that is, in the pressing state (+) of the combination key.

A total of 7 characters of 'G', 'B', 'M', 'Q', 'A', 'R' and 'S' among the second characters of 'G', 'B', 'M', 'Q', 'A', 'R', 'W', 'S', 'H', 'K' and 'D' correspond to this example, and the combinations thereof are as follows.

'G' is 'reversed J'+'C', 'B' is 'reversed J'+'E', and 'M' is 'reversed J'+'N'.

'Q' is 'reversed J'+'O', 'A' is 'reversed J'+'F', and 'R' is 'reversed J'+'P'.

'S' is 'reversed J'+'T'.

By way of exception, in a case where the second characters of 'W', 'H', 'K' and 'D' which are shared with the third characters and key are desired to be input in the pressing state of the 'reversed J' key like the input method of the second example, if the 'reversed J' key is successively input and then the representative key ('U', 'I', 'Y' or 'L') while maintaining the pressing state (+) are input, 'W', 'H', 'K', or 'D' is input. Such an example is as follows.

'W' is 'reversed J'+'reversed J'+'U', and 'H' is "reversed J'+'reversed J'+'I'.

'K' is 'reversed J'+'reversed J'+'Y', and 'D' is 'reversed J'+'reversed J' 'L'.

The representative key ('U', 'I', 'Y', or 'L') is pressed and released and the 'reversed J' is successively input, and thus, the third character may be input (may be retroactively applied to the second character). The combinations thereof are as follows.

'J' is 'U'+'reversed J'+'reversed J', and 'X' is 'I'+'reversed J'+'reversed J'.

'V' is 'Y'+'reversed J'+'reversed J', and 'Z' is 'L'+'reversed J'+'reversed J'.

In the present invention, in a case where the same character is input successively and repeatedly as in the first example and the second example, the following method is used.

The first character is repeatedly input by a method in which the character is successively input or the pressing state thereof is maintained.

The combination characters including the second characters and the third characters are repeatedly input by a method in which the representative key is successively input in the pressing state of the 'reversed J' key or the pressing state is maintained.

In this case, the repeated input of the second character using the representative key ('U', 'I', 'Y' or shared between the second character and the third character is performed by repeatedly input the second character by a method in which the 'reversed J' is successively input and the representative key is successively input while maintaining the pressing state or the pressing state is maintained.

Figure 7:
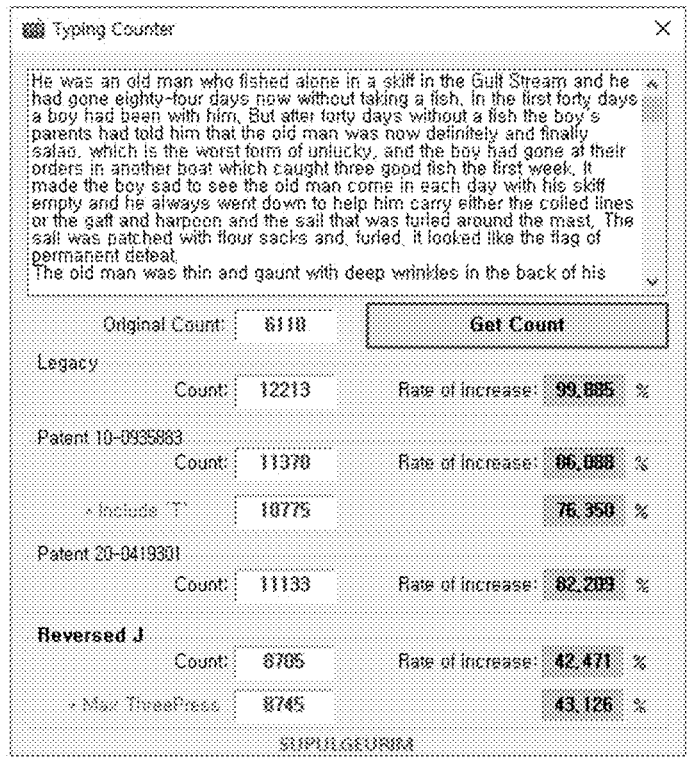
FIG. 7 is a diagram acquired by comparing typing count and efficiency between the present invention and the related art.

FIG. 7 is a diagram acquired by comparing typing count and efficiency between the present invention and the related art. Referring to FIG. 7, as a result of a typing count calculating program capable of verifying the efficiency of the present invention, data is acquired by calculating the typing count and the rate of increase in the typing count through the application of the input methods of the respective technologies to a part of (6110 characters) of arbitrary English document (original document of 'The Old Man and the Sea').

In general, it can be seen that a typing count of 90 to 110% averagely doubles in 'Legacy' (technology of FIG. 1) input method embedded in a compact device.

It can be seen that efficiency is 85 to 90% (75 to 85% when a 'T' character is assigned as the representative key) in an input method using the technology of 'Registration No. 10-0935883' (technology of FIG. 3) which is the related art, and it can be seen that efficiency is 80 to 90% in an input method using the technology of 'Registration No. 20-0419301' (technology of FIG. 4) which is the related art.

It can be seen that the input can be input at a lowest typing count of 30 to 45% (35 to 50% in a touch-type input device requiring the input at a maximum typing count of 3) among the comparison targets in the alphabet input system of the present invention.

It can be seen through such results that similar rates of increase are constantly maintained irrespective of the number or content of characters.

Meanwhile, the assignment and arrangement of characters may be different depending on the characteristics and convenience of the system. If the present invention is applied to the input system having 11 keys, it is preferable that 'T' is reassigned as the third character of 'E' or 'F' and 'S' is reassigned as the third characters of 'C'.

If the number of keys is 10 or less, the remaining characters are dividedly assigned to character groups having no third characters in consideration of the similarity of the characters, and the characters are input in the same method as the input method of the third character.

The positions of the keys are typically assigned according to the basic arrangement shown in FIG. 5, or may be reassigned according to the convenience or environment such as firmware or software setting.

If the user desires to use a existing standard input system as a one-handed (one-handed keyboard) or compact input system, it is possible to establish a one-handed or compact character input system without additional cost by integrating the principle of the present invention and the published Korean input technology ('Chonjiin' keyboard or 'Naratgul' keyboard) and applying a hooking technology as software.

Such an input system is effective when the keyboard is used with one hand, and may be preferentially applied to a typical numeric dedicated input device (keypad).

The original shape of the character may be generally maintained in a combination expression form, but in order to obtain intuitiveness more excellent than those of the second character and the third character, it is preferable that 'I ('H' or 'X'), 'T' ('S'), 'Y' ('K' or 'V') and 'L' ('Z') are expressed as the most natural combination form within a range in which the characters can be recognized.

Figure 8:
FIG. 8 is a diagram showing the diversity of expression forms of the combination characters according to the embodiment of the present invention.

FIG. 8 is an example in which various expression forms of the alphabets are utilized in implementing the present invention. It is possible to further reduce time necessary for the individuals to learn the usage by repeatedly advancing a future character expression form and developing the current input system as an input system capable of easily recognizing the characters.

Several tendencies are given so as to allow the user to more easily memorize the arrangement of the characters in using the present invention. Firstly, there is a tendency that a character group in forward order of priority in writing the alphabets is disposed in a position in an upper left and lower right direction ('ㄴ') and a character group in reverse order in writing the alphabets is disposed in an opposite direction ('ㄱ').

Secondly, there is a tendency that 'reversed J' having a small size is combined with the character group in the upper left and lower right direction and 'reversed J' having a large size is combined with the character group in the opposite direction.

Thirdly, it can be seen that the third characters 'J' and 'V' are derived from 'U' and 'Y' by using the vertical and horizontal sections of the original shapes thereof (expression "the 'reversed J' is removed" may be used in some expression forms) and these characters are arranged in the central lower portion such that such a difference can be easily memorized.

As described above, in the present invention, characters that can be derived by adding the 'reversed J' to the alphabet characters are grouped in one a group. Here, if simple regularity such as the input order of representative key+combination key or combination key+representative key is given, anyone can quickly input a desired character in a compact input system with easy.

Although some embodiments of the present invention have been illustrated and described, it should be understood to those skilled in the art that the present embodiment can be modified without departing from the principle and spirit of the present invention. The scope of the present invention may be determined by the claims and the equivalents.

INDUSTRIAL APPLICABILITY

The present invention relates to a character alphabet input system which uses an intuitive and consistent character combination method, is easily applicable to a compact device, is capable of inputting a character desired to be input the minimized input number of times, is capable of consistently performing the repeated input of an input character, and is used in a compact cellular phone or smart phone having high portability and compatibility by sharing the form of a typical character input system having 4×3 key arrangement.

The invention claimed is:
1. An alphabet input system, comprising:
a plurality of representative keys that is used to input first matched characters among alphabets; and
combination keys that are input by combining any one of the plurality of representative keys and are used to generate combination characters which are alphabets except for the first characters,
wherein the combination characters are pictographically derived from combinations of a combination symbol having a 'reversed J' shape as a combination key with a shape of the first character matching to each of the plurality of representative keys (here, the reversed J means a reversed shape of J), wherein the combination character includes a second character which is a character generated by sequentially inputting the representative key and the combination key, and a third character which is a character generated by sequentially inputting the combination key and the representative key, and wherein the first character includes 'C', 'E', 'N', 'O', 'F', 'P', 'U', 'T', 'I', 'Y', and 'L' among the alphabets, the second character includes 'G', 'B', 'M', 'Q', 'A', 'R', 'W', 'S', 'H', 'K', and 'D' among the alphabets, and the third character includes 'J', 'X', 'V', and 'Z' among the alphabets.

2. The alphabet input system according to claim 1, wherein the plurality of representative keys is 11 keys, the combination key is one key, and the keys are used to input the alphabets.

3. The alphabet input system according to claim 2, wherein positions in which the plurality of representative keys and the combination key are arranged are able to be changed, and the first characters which respectively match to the plurality of representative keys are able to be set.

4. The alphabet input system according to claim 2, wherein a designation character input by an input form of the third characters is able to be additionally set to the plurality of representative keys to which the third characters of 'J', 'X', 'V' and 'Z' are not set.

\* \* \* \* \*